(12) United States Patent
Tsai et al.

(10) Patent No.: US 9,893,900 B2
(45) Date of Patent: Feb. 13, 2018

(54) INTELLIGENT ILLUMINATION SYSTEM, NETWORK APPARATUS AND OPERATING METHOD THEREOF

(71) Applicant: DELTA NETWORKS, INC., Taoyuan (TW)

(72) Inventors: Cheng-Yuan Tsai, Taoyuan (TW); Shu-Li Chang, Taoyuan (TW)

(73) Assignee: DELTA NETWORKS, INC., Taoyuan (TW)

( * ) Notice: Subject to any disclaimer, the term of this patent is extended or adjusted under 35 U.S.C. 154(b) by 264 days.

(21) Appl. No.: 14/741,968

(22) Filed: Jun. 17, 2015

(65) Prior Publication Data

US 2016/0241408 A1 Aug. 18, 2016

(30) Foreign Application Priority Data

Feb. 12, 2015 (TW) .............................. 104104678 A

(51) Int. Cl.
*H04L 12/18* (2006.01)
*H04L 1/16* (2006.01)

(52) U.S. Cl.
CPC ............ *H04L 12/18* (2013.01); *H04L 1/1614* (2013.01); *H04L 12/1886* (2013.01)

(58) Field of Classification Search
CPC . H04L 12/1886; H04L 1/1607; H04L 1/1614; H04L 1/18
See application file for complete search history.

(56) References Cited

U.S. PATENT DOCUMENTS

| | | | |
|---|---|---|---|
| 8,594,704 B2 | 11/2013 | Karabinis | |
| 2012/0051278 A1 | 3/2012 | Philips et al. | |
| 2012/0207158 A1 | 8/2012 | Srinivasan et al. | |
| 2013/0083721 A1* | 4/2013 | Wu | H04W 36/0055 370/315 |
| 2014/0010102 A1 | 1/2014 | Cho et al. | |
| 2015/0008828 A1* | 1/2015 | Carrigan | H05B 33/0842 315/131 |
| 2016/0088708 A1* | 3/2016 | Anthony | H05B 37/029 315/294 |

FOREIGN PATENT DOCUMENTS

| | | |
|---|---|---|
| CN | 101641938 | 2/2010 |
| CN | 102752881 | 10/2012 |
| TW | 200402967 | 2/2004 |
| WO | 2014093393 | 6/2014 |

* cited by examiner

*Primary Examiner* — Omer S Mian
(74) *Attorney, Agent, or Firm* — Hauptman Ham, LLP

(57) ABSTRACT

A network apparatus coupled to a plurality of nodes. The nodes are clustered into a plurality of groups. The network apparatus includes a storage component and a controller. The storage component is configured to store a plurality of group numbers corresponding to the groups and a plurality of node numbers corresponding to the nodes. The controller is configured to transmit a broadcast packet to all of the nodes. The broadcast packet includes a local network broadcast message. The local network broadcast message includes operating information. The local network broadcast message corresponds to at least one of the group numbers and the node numbers. Each of the nodes determines whether to dismiss the operating information of the broadcast packet according to the local network broadcast message of the broadcast packet.

11 Claims, 10 Drawing Sheets

INTELLIGENT ILLUMINATION SYSTEM, NETWORK APPARATUS AND OPERATING METHOD THEREOF

RELATED APPLICATIONS

This application claims priority to Taiwan Application Serial Number 104104678, filed Feb. 12, 2015, which is herein incorporated by reference.

BACKGROUND

Technical Field

The present disclosure relates to an electronic apparatus. More particularly, the present disclosure relates to a network apparatus.

Description of Related Art

With advances in technology, network systems have been widely used.

A typical network system includes a plurality of nodes. A node can transmit a command or data to another node through a packet. In some applications, in the transmission of a command or data from a source node to a plurality of destination nodes, the source node has to send packets to each of the destination nodes one at a time, and then wait for responses from the destination nodes. As a result of such an operation, a large number of packets will be generated, and cause the network system to slow down.

SUMMARY

One aspect of the present disclosure is related to a network apparatus. In accordance with one embodiment of the present disclosure, the network apparatus is coupled to a plurality of nodes. The nodes are clustered into a plurality of groups. The network apparatus includes a storage component and a controller. The storage component is configured to store a plurality of group numbers corresponding to the groups and a plurality of node numbers corresponding to the nodes. The controller is configured to transmit a broadcast packet to all of the nodes. The broadcast packet includes a local network broadcast message. The local network broadcast message includes operating information. The local network broadcast message corresponds to at least one of the group numbers and the node numbers. Each of the nodes determines whether to dismiss the operating information of the broadcast packet according to the local network broadcast message of the broadcast packet.

In accordance with one embodiment of the present disclosure, the local network broadcast message includes at least one node identifier, the node identifier includes data or a command, the operating information corresponds to the data or the command, and when a corresponding node corresponding to the node identifier receives the broadcast packet, the corresponding node operates according to the data or the command.

In accordance with one embodiment of the present disclosure, the local network broadcast message includes at least one group identifier, the group identifier includes data or a command, the operating information corresponds to the data or the command, and when a plurality of corresponding nodes in a corresponding group corresponding to the group identifier receive the broadcast packet, the corresponding nodes operate according to the data or the command.

In accordance with one embodiment of the present disclosure, the local network broadcast message includes a group bit-map, a node bit-map, and data or a command, the operating information corresponds to the data or the command, and when at least one corresponding node corresponding to the group bit-map and the node bit-map receives the broadcast packet, the corresponding node operates according to the data or the command.

In accordance with one embodiment of the present disclosure, the group bit-map includes a plurality of bits, and each of the bits of the group bit-map corresponds to one of the group numbers.

In accordance with one embodiment of the present disclosure, the node bit-map includes a plurality of bits, and each of the bits of the node bit-map corresponds to one of the node numbers.

In accordance with one embodiment of the present disclosure, the local network broadcast message includes a plurality of group identifiers, each of the group identifiers includes a node bit-map, and data or a command, the operating information corresponds to the data or the command, and when a plurality of corresponding nodes corresponding to the group identifiers and the node bit-maps receive the broadcast packet, each of the corresponding nodes operates according to the data or the command in a corresponding one of the group identifiers.

In accordance with one embodiment of the present disclosure, the local network broadcast message is located in a payload field of the broadcast packet.

In accordance with one embodiment of the present disclosure, the controller is further configured for determining a corresponding group number and a corresponding node number of a new added node when an adding request from the new added node is received; generating a first binary bit-string according to the corresponding group number; generating a second binary bit-string according to the corresponding node number; and providing the corresponding group number, the corresponding node number, the first binary bit-string, and the second binary bit-string to the new added node, so as to allow the new added node to determine whether to dismiss the operating information of the broadcast packet according to at least one of the corresponding group number, the corresponding node number, the first binary bit-string, and the second binary bit-string.

Another aspect of the present disclosure relates to an operating method of a network apparatus. In accordance with one embodiment of the present disclosure, the network apparatus is coupled to a plurality of nodes. The nodes are clustered into a plurality of groups. The operating method includes storing a plurality of group numbers corresponding to the groups and a plurality of node numbers corresponding to the nodes, and transmitting a broadcast packet to all of the nodes. The broadcast packet includes a local network broadcast message. The local network broadcast message includes operating information. The local network broadcast message corresponds to at least one of the group numbers and the node numbers. Each of the nodes determines whether to dismiss the operating information of the broadcast packet according to the local network broadcast message of the broadcast packet.

In accordance with one embodiment of the present disclosure, the local network broadcast message includes at least one node identifier, the node identifier includes data or a command, the operating information corresponds to the data or the command, and when a corresponding node corresponding to the node identifier receives the broadcast packet, the corresponding node operates according to the data or the command.

In accordance with one embodiment of the present disclosure, the local network broadcast message includes at least one group identifier, the group identifier includes data or a command, the operating information corresponds to the data or the command, and when a plurality of corresponding nodes in a corresponding group corresponding to the group identifier receive the broadcast packet, the corresponding nodes operate according to the data or the command.

In accordance with one embodiment of the present disclosure, the local network broadcast message includes a group bit-map, a node bit-map, and data or a command, the operating information corresponds to the data or the command, and when at least one corresponding node corresponding to the group bit-map and the node bit-map receives the broadcast packet, the corresponding node operates according to the data or the command.

In accordance with one embodiment of the present disclosure, the group bit-map includes a plurality of bits, and each of the bits of the group bit-map corresponds to one of the group numbers.

In accordance with one embodiment of the present disclosure, the node bit-map includes a plurality of bits, and each of the bits of the node bit-map corresponds to one of the node numbers.

In accordance with one embodiment of the present disclosure, the local network broadcast message includes a plurality of group identifiers, each of the group identifiers includes a node bit-map, and data or a command, the operating information corresponds to the data or the command, and when a plurality of corresponding nodes corresponding to the group identifiers and the node bit-maps receive the broadcast packet, each of the corresponding nodes operates according to the data or the command in a corresponding one of the group identifiers.

In accordance with one embodiment of the present disclosure, the local network broadcast message is located in a payload field of the broadcast packet.

In accordance with one embodiment of the present disclosure, the operating method further includes determining a corresponding group number and a corresponding node number of a new added node when an adding request from the new added node is received; generating a first binary bit-string according to the corresponding group number; generating a second binary bit-string according to the corresponding node number; and providing the corresponding group number, the corresponding node number, the first binary bit-string, and the second binary bit-string to the new added node, so as to allow the new added node to determine whether to dismiss the operating information of the broadcast packet according to at least one of the corresponding group number, the corresponding node number, the first binary bit-string, and the second binary bit-string.

Another aspect of the present disclosure is directed to an intelligent illumination system. In accordance with one embodiment of the present disclosure, the intelligent illumination system includes a plurality of illumination nodes and a network apparatus. The illumination nodes are clustered as a plurality of groups. The network apparatus is coupled to the illumination nodes. The network apparatus is configured for storing a plurality of group numbers corresponding to the groups and a plurality of node numbers corresponding to the illumination nodes, and transmitting a broadcast packet to all of the illumination nodes. The broadcast packet includes a local network broadcast message. The local network broadcast message includes operating information. The local network broadcast message corresponds to at least one of the group numbers and the node numbers. Each of the illumination nodes determines whether to dismiss the operating information of the broadcast packet according to the local network broadcast message of the broadcast packet.

In accordance with one embodiment of the present disclosure, the local network broadcast message includes a group bit-map and a node bit-map, and the group bit-map includes a plurality of first bits. Each of the first bits of the group bit-map corresponds to one of the group numbers, and the node bit-map includes a plurality of second bits. Each of the second bits of the node bit-map corresponds to one of the node numbers.

Through utilizing an application of one embodiment described above, the network apparatus can broadcast the broadcast packet to all of the nodes, such that each of the nodes determines whether to dismiss the operating information of the broadcast packet according to the local network broadcast message of the broadcast packet. Through such an operation, it is not necessary to transmit the packets to different nodes one at a time, so that slowdown of the network system caused by such single-packet transmission can be avoided.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
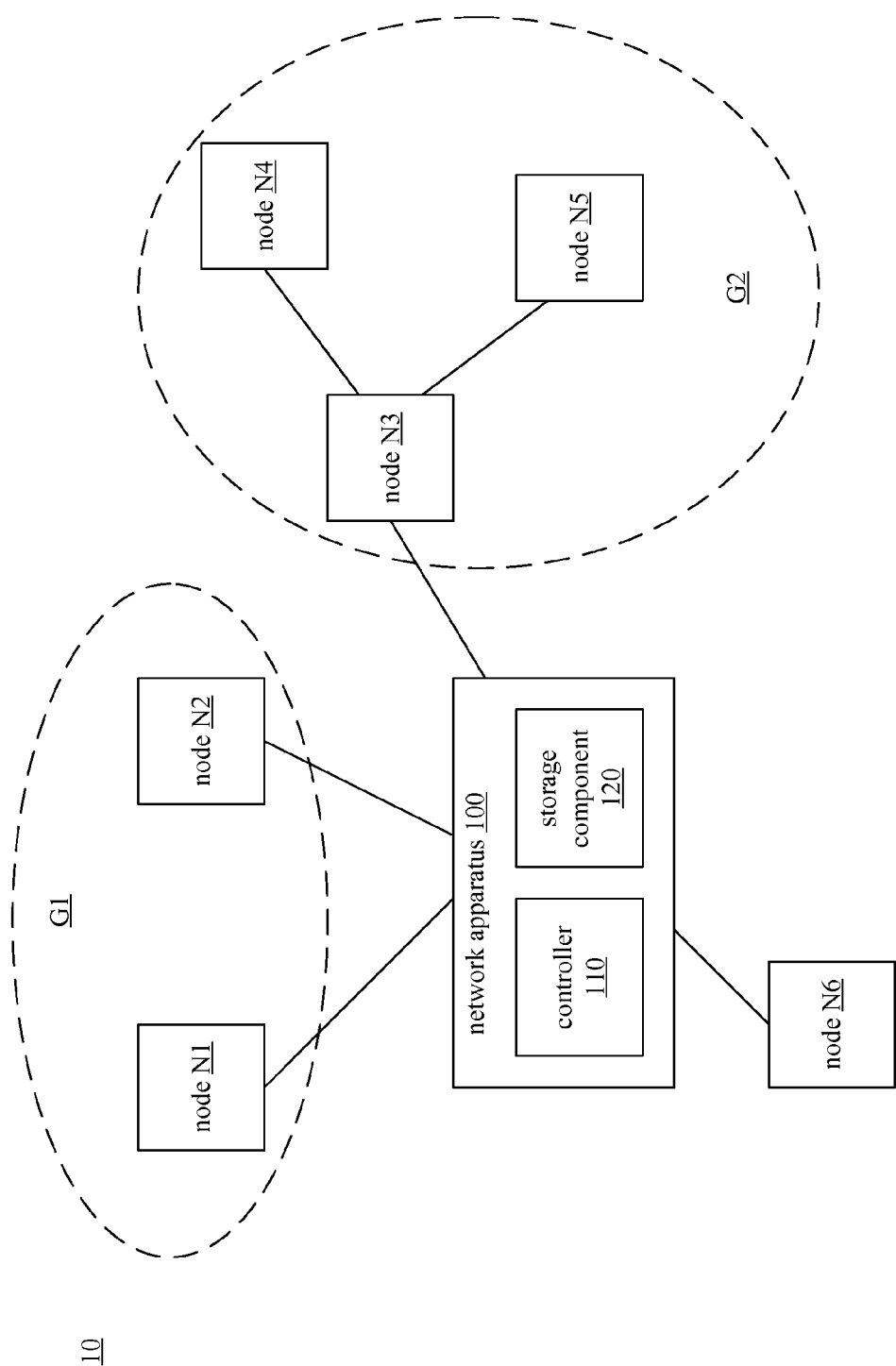
FIG. 1 is a schematic diagram of a network system in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

FIG. 1 is a schematic diagram of a network system 10. To facilitate the description to follow, in the following embodiments, an intelligent illumination system will be taken as an example, but the present disclosure is not limited to such an embodiment.

In this embodiment, the network system 10 can operate according to the IEEE 802.15.4 protocol, a sensor network protocol, an Ad-hoc network protocol, or an Ethernet protocol, but the present disclosure is not limited in this regard.

In this embodiment, the network system 10 includes a network apparatus 100 and nodes N1-N6, in which the network apparatus 100 and the nodes N1-N6 are coupled to each other. In this embodiment, the network apparatus 100 can be a coordinator in a sensor network, and the nodes N1-N6 can be illumination nodes, but the present disclosure is not limited in this regard. In this embodiment, the network apparatus 100 and the nodes N1-N6 are within a common collision domain. That is, during when one of the network apparatus 100 and the nodes N1-N6 sends a message, the other of the network apparatus 100 and the nodes N1-N6 can not send any other message.

In this embodiment, the nodes N1, N2 can be clustered as a group G1, and the nodes N3, N4, N5 can be clustered as a group G2.

It should be noted that, in the embodiment above, six nodes and two groups are taken as an example, but the numbers of the nodes and the groups can be varied on the basis of actual requirements, and the present disclosure is not limited to the embodiment above. In this embodiment, the network apparatus 100 includes a controller 110 and a storage component 120. The storage component 120 can be configured to store a look up table T1. The look up table T1 may include a plurality of group numbers corresponding to the groups G1, G2, a plurality of node numbers corresponding to the nodes N1-N6, a plurality of binary bit-strings corresponding to the groups G1, G2, and a plurality of binary bit-strings corresponding to the nodes N1-N6. The look up table T1 is as illustrated below in one embodiment.

| Group number | node number | binary bit-string corresponding to group | binary bit-string corresponding to node |
|---|---|---|---|
| 0001 | 0001 | 00000001 | 00000001 |
| 0001 | 0002 | 00000001 | 00000010 |
| 0002 | 0003 | 00000010 | 00000100 |
| 0002 | 0004 | 00000010 | 00001000 |
| 0002 | 0005 | 00000010 | 00010000 |
| 0000 | 0006 | 00000000 | 00100000 |

In this embodiment, the node number corresponding to the node N1 is "0001," the node number corresponding to the node N2 is "0002," the node number corresponding to the node N3 is "0003," the node number corresponding to the node N4 is "0004," the node number corresponding to the node N5 is "0005," the node number corresponding to the node N6 is "0006," the group number corresponding to the group G1 is "0001," and the group number corresponding to the group G2 is "0002."

In this embodiment, a binary bit-string corresponding to one of the nodes N1-N6 can be used to indicate the one of the nodes N1-N6. For example, a binary bit-string with the first bit from right to left being "1" and the other bits being "0" can be used to indicate the node N1 with the node number "0001," a binary bit-string with the second bit from right to left being "1" and the other bits being "0" can be used to indicate the node N2 with the node number "0002," a binary bit-string with the third bit from right to left being "1" and the other bits being "0" can be used to indicate the node N3 with the node number "0003," a binary bit-string with the fourth bit from right to left being "1" and the other bits being "0" can be used to indicate the node N4 with the node number "0004," a binary bit-string with the fifth bit from right to left being "1" and the other bits being "0" can be used to indicate the node N5 with the node number "0005," and a binary bit-string with the sixth bit from right to left being "1" and the other bits being "0" can be used to indicate the node N6 with the node number "0006." That is, the binary bit-strings separately use different bits in different places therein to indicate different nodes.

Similarly, in this embodiment, a binary bit-string corresponding to one of the groups G1, G2 can be used to indicate the one of the groups G1, G2. For example, a binary bit-string with the first bit from right to left being "1" and the other bits being "0" can be used to indicate the group G1 with the node number "0001," and a binary bit-string with the second bit from right to left being "1" and the other bits being "0" can be used to indicate the group G2 with the node number "0002." That is, the binary bit-strings separately use different bits in different places therein to indicate different groups.

In this embodiment, since the node N6 is not clustered into any one of the groups, the group number of the node N6 is a default value "0000" corresponding to a binary bit-string "00000000."

It should be noted that the node numbers of the nodes N1-N6 can be determined and varied by the network apparatus 110 based on actual requirements. The node numbers of the nodes N1-N6 are not inherent numbers, such as media access control (MAC) addresses, of the nodes N1-N6.

In this embodiment, the controller 110 can be configured to provide a broadcast packet to the nodes N1-N6 to transmit a command or data to any one or more of the nodes N1-N6. More specifically, in this embodiment, the controller 110 directly broadcasts a broadcast packet PKT having a local network broadcast message to all of the nodes N1-N6 all at once, so as to allow one or more of the nodes N1-N6 corresponding to the local network broadcast message to operate according to an operating information (e.g., a command or data in the broadcast packet PKT) of the local network broadcast message. The other of the nodes N1-N6 which do not correspond to the local network broadcast message dismiss the operating information of the local network broadcast message, and refrain from operating according to the operating information. For example, when the local network broadcast message corresponds to the nodes N2, N3, the nodes N2, N3 operate according to the command or data in the broadcast packet PKT, and the nodes N1, N4-N6 dismiss the command or data in the broadcast packet PKT and refrain from operating according to the command or data in the broadcast packet PKT.

In one embodiment, the broadcast packet PKT further includes a broadcast header. For example, when the broadcast packet PKT is an Ethernet frame, the destination MAC address of the broadcast packet PKT is the broadcast address "FF:FF:FF:FF:FF:FF." When the broadcast packet PKT is a media access control (MAC) layer frame defined in the IEEE 802.15.4 protocol, the destination address of the broadcast packet PKT is the broadcast address "0xFFFF." When the network apparatus 100 transmits the broadcast packet PKT to the nodes N1-N6, each of the nodes N1-N6 receives the broadcast packet PKT according to the broadcast header of the broadcast packet PKT and analyzes the local network broadcast message therein. When one of the nodes N1-N6 acknowledges that the local network broadcast message in the broadcast packet PKT does not correspond to itself, this node will dismiss the operating information of the local network broadcast message.

In one embodiment, the local network broadcast message is located in the payload field of the broadcast packet PKT. For example, when the broadcast packet PKT is a physical layer frame defined in the IEEE 802.15.4 protocol, the local network broadcast message may be located in the PHY payload field. When the broadcast packet PKT is an Ethernet frame, the local network broadcast message may be located in the Ethernet payload field. However, in some embodiments, at least a portion of the data of the local network broadcast message may be located in the PHY header field of the physical layer frame defined in the IEEE 802.15.4 protocol, and the present disclosure is not limited to such embodiments.

In one embodiment, there are four types of the local network broadcast message. Details of the local network broadcast message are provided in the paragraphs below with reference to FIGS. 2-5.

Figure 2:
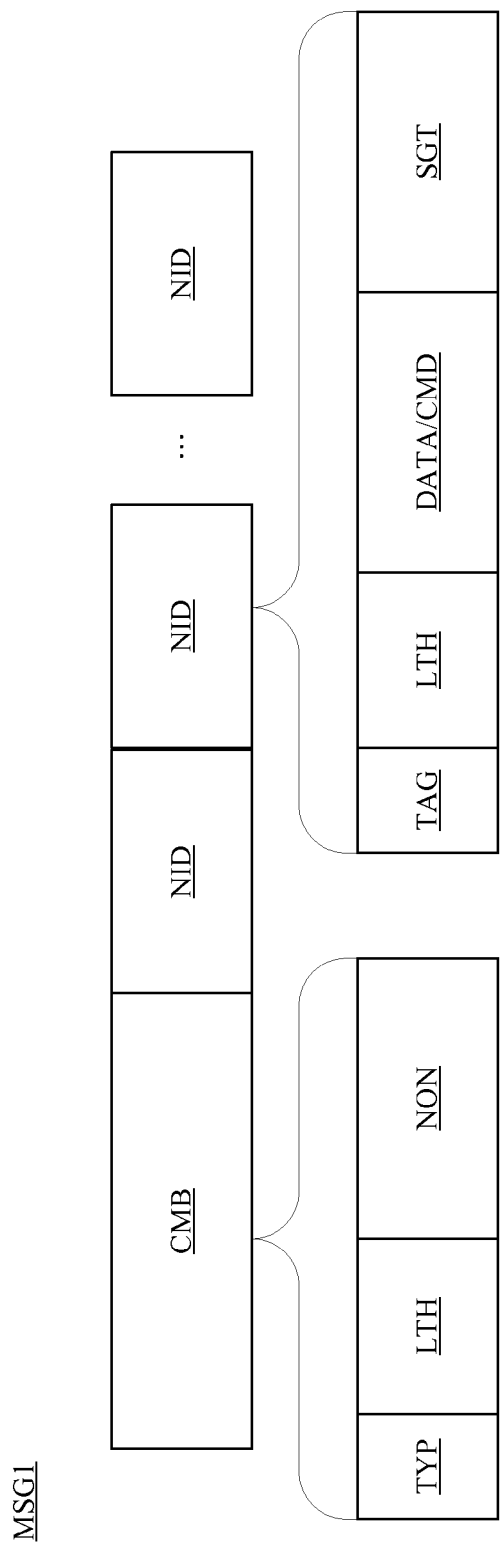
FIG. 2 illustrates a format of a first type local network broadcast message in accordance with one embodiment of the present disclosure.

Particular reference is made to FIG. 2. The first type local network broadcast message MSG1 may include a field CMB and a plurality of node identifiers NID.

The field CMB of the first type local network broadcast message MSG1 may include a field TYP, a field LTH, and a field NON. The field TYP of the field CMB indicates the type of the local network broadcast message (e.g., indicates one type from among the first type, the second type, the third type, and the fourth type). The field LTH of the field CMB indicates the length of the field NON. The field NON of the field CMB indicates the quantity of the node identifiers NID in the first type local network broadcast message MSG1.

Each of the node identifiers NID of the first type local network broadcast message MSG1 includes a field TAG, a field LTH, data or a command DATA/CMD, and a field SGT. The field TAG of one node identifier NID indicates a node number which the first type local network broadcast message MSG1 corresponds to. The field LTH of this node identifier NID indicates the length of the data or command DATA/CMD. The data or command DATA/CMD of this node identifier NID is the data or command which the network apparatus 100 wishes to transmit to the node corresponding to this node identifier NID. The field SGT of this node identifier NID indicates a serial number of the data or command DATA/CMD of this node identifier NID.

For example, when both of the nodes N1, N2 receive the broadcast packet PKT having the first type local network broadcast message MSG1, each of the nodes N1, N2 can determine whether the field TAG of one node identifier NID in the first type local network broadcast message MSG1 corresponds to the node number of itself. If the field TAG of a first node identifier NID corresponds to the node number of the node N1, and the field TAG of a second node identifier NID corresponds to the node number of the node N2, the node N1 operates according to the data or command DATA/CMD in the first node identifier NID, and the node N2 operates according to the data or command DATA/CMD in the second node identifier NID. For example, the node N1 may light up according to an illumination command in the first node identifier NID, and the node N2 may update the firmware therein according to update data in the second node identifier NID.

By using the broadcast packet PKT having the first type local network broadcast message MSG1, different commands and/or data can be transmitted to different nodes simultaneously.

Figure 3:
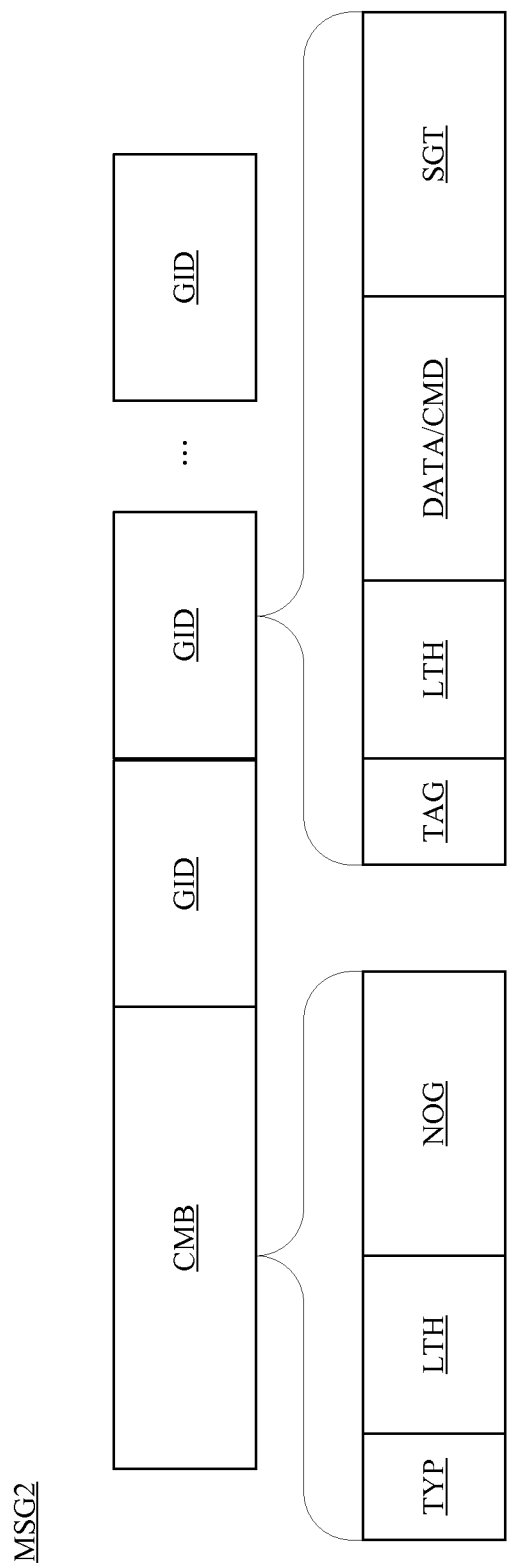
FIG. 3 illustrates a format of a second type local network broadcast message in accordance with one embodiment of the present disclosure.

Particular reference is made to FIG. 3. The second type local network broadcast message MSG2 may include a field CMB and a plurality of group identifiers GID.

The field CMB of the second type local network broadcast message MSG2 may include a field TYP, a field LTH, and a field NOG. The field TYP of the field CMB indicates the type of the local network broadcast message (e.g., indicates one type from among the first type, the second type, the third type, and the fourth type). The field LTH of the field CMB indicates the length of the field NOG. The field NOG of the field CMB indicates the quantity of the group identifiers GID in the second type local network broadcast message MSG2.

Each of the group identifiers GID of the second type local network broadcast message MSG2 includes a field TAG, a field LTH, data or a command DATA/CMD, and a field SGT. The field TAG of one group identifier GID indicates a group number which the second type local network broadcast message MSG2 corresponds to. The field LTH of this group identifier GID indicates the length of the data or command DATA/CMD. The data or command DATA/CMD of this group identifier GID is the data or command which the network apparatus 100 wishes to transmit to all of the nodes in the group corresponds to this group identifier GID. The field SGT of this group identifier GID indicates a serial number of the data or command DATA/CMD of this group identifier GID.

For example, when the nodes N1, N2 in the group G1 and the nodes N3-N5 in the group G2 receive the broadcast packet PKT having the second type local network broadcast message MSG2, the nodes N1-N5 can separately determine whether the field TAG of one group identifier GID in the second type local network broadcast message MSG2 corresponds to the group number of themselves. If the field TAG of a first group identifier GID corresponds to the group number of the group G1, and the field TAG of a second group identifier GID corresponds to the group number of the group G2, the nodes N1, N2 operate according to the data or command DATA/CMD in the first group identifier GID, and the nodes N3-N5 operate according to the data or command DATA/CMD in the second group identifier GID. For example, the nodes N1, N2 may light up according to an illumination command in the first group identifier GID, and the nodes N3-N5 may update the firmware therein according to update data in the second group identifier GID.

By using the broadcast packet PKT having the second type local network broadcast message MSG2, different commands and/or data can be transmitted to different groups simultaneously, and make the nodes in the same group operate identically.

Figure 4:
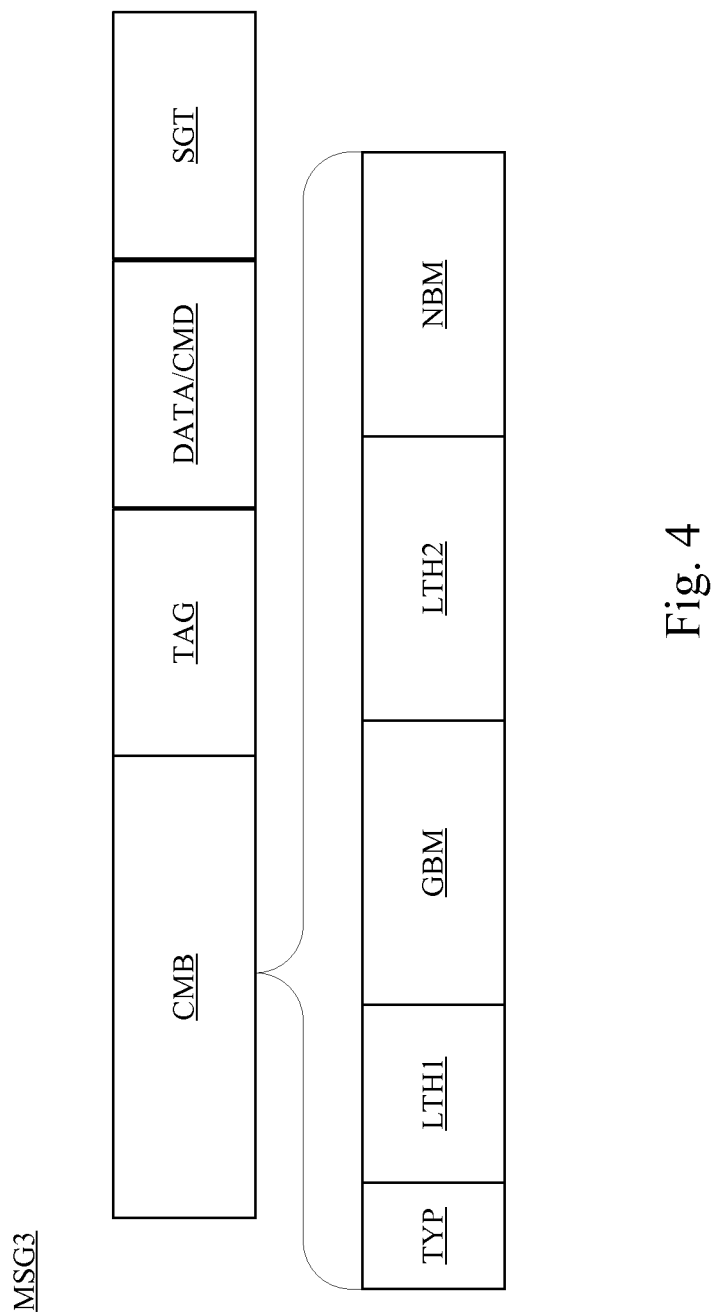
FIG. 4 illustrates a format of a third type local network broadcast message in accordance with one embodiment of the present disclosure.

Particular reference is made to FIG. 4. The third type local network broadcast message MSG3 may include a field CMB, a field TAG, data or a command DATA/CMD, and a field SGT.

The field CMB of the third type local network broadcast message MSG3 may include a field TYP, a field LTH1, a group bit-map GBM, a field LTH2, and a node bit-map NBM. The field TYP of the field CMB indicates the type of the local network broadcast message (e.g., indicates one type from among the first type, the second type, the third type, and the fourth type). The field LTH1 of the field CMB indicates the length of the group bit-map GBM. The group bit-map GBM indicates the groups which the third type local network broadcast message MSG3 corresponds to. The field LTH2 of the field CMB indicates the length of the node bit-map NBM. The node bit-map NBM indicates the nodes which the third type local network broadcast message MSG3 corresponds to.

In one embodiment, the group bit-map GBM includes a plurality of bits, and each of the bits of the group bit-map GBM corresponds to a group number. For example, the first bit of the group bit-map GBM from right to left corresponds to the group number of the group G1, the second bit of the group bit-map GBM from right to left corresponds to the group number of the group G2, and the rest may be deduced by analogy. For instance, when the group bit-map GBM is "00000001," the third type local network broadcast message MSG3 corresponds to the node N1, and when the group bit-map GBM is "00000011," the third type local network broadcast message MSG3 corresponds to the nodes N1, N2.

In one embodiment, the node bit-map NBM includes a plurality of bits, and each of the bits of the node bit-map NBM corresponds to a node number. For example, the first bit of the node bit-map NBM from right to left corresponds to the node number of the node N1, the second bit of the node bit-map NBM from right to left corresponds to the node number of the node N2, and the rest may be deduced by analogy. For instance, when the node bit-map NBM is "00100001," the third type local network broadcast message MSG3 corresponds to the nodes N1, N6, and when the node bit-map NBM is "00000110," the third type local network broadcast message MSG3 corresponds to the nodes N2, N3.

The field TAG of the third type local network broadcast message MSG3 indicates related information of the data or command DATA/CMD of the third type local network broadcast message MSG3. The data or command DATA/CMD of the third type local network broadcast message MSG3 is the data or command which the network apparatus 100 wishes to transmit to the nodes corresponding to the third type local network broadcast message MSG3. The field SGT of the third type local network broadcast message MSG3 indicates a serial number of the data or command DATA/CMD.

For example, when both of the group bit-map GBM and the node bit-map NBM of the third type local network broadcast message MSG3 in the broadcast packet PKT is 0, all of the nodes N1-N6 operate according to the data or command DATA/CMD of the third type local network broadcast message MSG3, and none of the nodes N1-N6 dismisses the operating information in the broadcast packet PKT. When the group bit-map GBM of the third type local network broadcast message MSG3 in the broadcast packet PKT is 0, and the node bit-map NBM of the third type local network broadcast message MSG3 in the broadcast packet PKT is greater than 0 (e.g., "00001010"), the nodes corresponding to the node bit-map NBM (e.g., the nodes N2, N4) operate according to the data or command DATA/CMD of the third type local network broadcast message MSG3, and the nodes not corresponding to the node bit-map NBM (e.g., the nodes N1, N3, N5-N6) dismiss the data or command DATA/CMD of the third type local network broadcast message MSG3. When the group bit-map GBM of the third type local network broadcast message MSG3 in the broadcast packet PKT is greater than 0 (e.g., "00000011"), and the node bit-map NBM of the third type local network broadcast message MSG3 in the broadcast packet PKT is 0, all of the nodes in the groups corresponding to the group bit-map GBM (e.g., groups G1, G2) operate according to the data or command DATA/CMD of the third type local network broadcast message MSG3, and the node not corresponding to the group bit-map GBM (e.g., the node N6) dismisses the data or command DATA/CMD of the third type local network broadcast message MSG3. When the group bit-map GBM of the third type local network broadcast message MSG3 in the broadcast packet PKT is greater than 0 (e.g., "00000011"), and the node bit-map NBM of the third type local network broadcast message MSG3 in the broadcast packet PKT is also greater than 0 (e.g., "00001010"), the nodes corresponding to both of the group bit-map GBM and the node bit-map NBM (e.g., the nodes N2, N4) operate according to the data or command DATA/CMD of the third type local network broadcast message MSG3, and the nodes not corresponding to the group bit-map GBM and the node bit-map NBM (e.g., the nodes N1, N3, N5-N6) dismiss the data or command DATA/CMD of the third type local network broadcast message MSG3.

By using the broadcast packet PKT having the third type local network broadcast message MSG3, identical command and/or data can be transmitted to different nodes simultaneously. In addition, by using the third type local network broadcast message MSG3, identical command and/or data can be transmitted to different groups simultaneously to make the nodes in the same group operate identically. Moreover, by using the group bit-map GBM and the node bit-map NBM, the length of the broadcast packet PKT can be shortened greatly.

Figure 5:
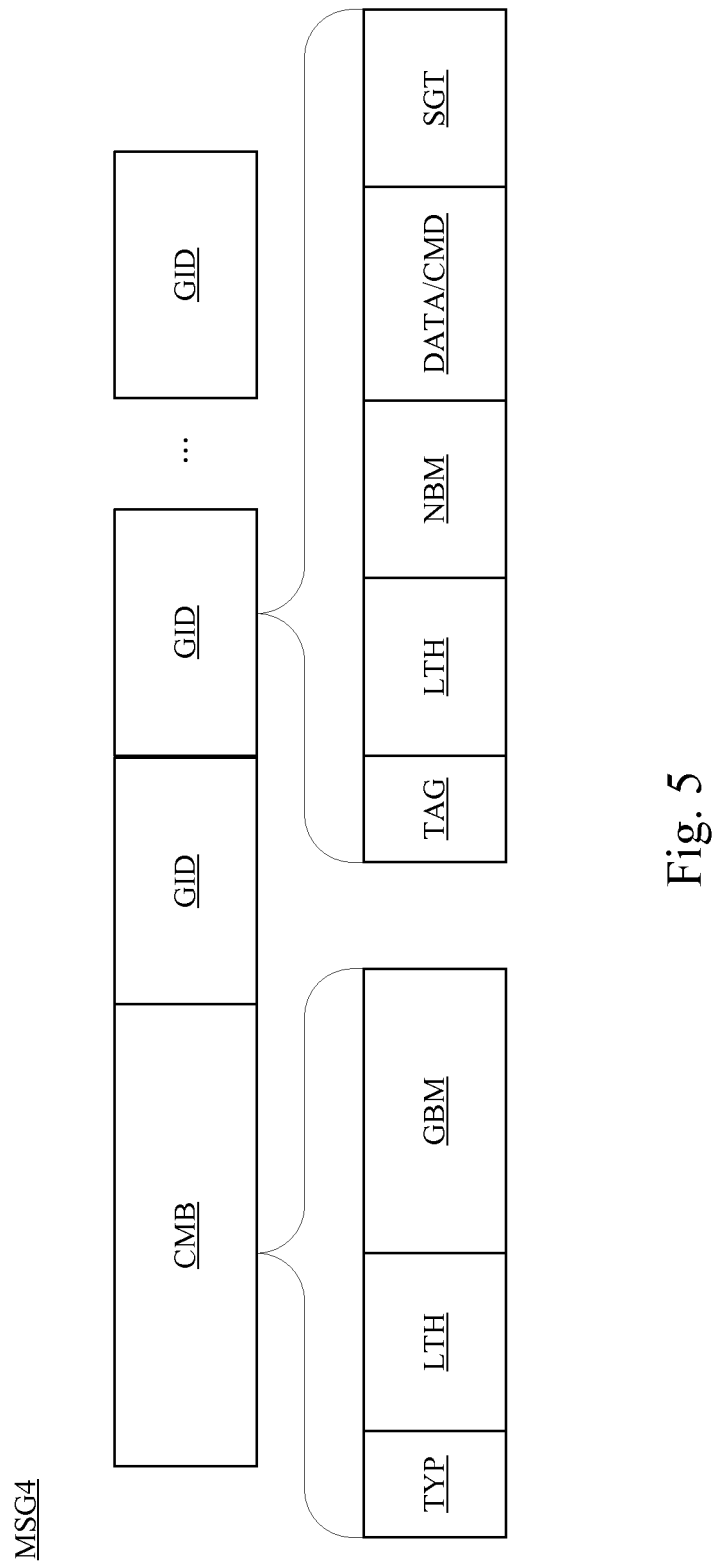
FIG. 5 illustrates a format of a fourth type local network broadcast message in accordance with one embodiment of the present disclosure.

Particular reference is made to FIG. 5. The fourth type local network broadcast message MSG4 may include a field CMB, and a plurality of group identifiers GID.

The field CMB of the fourth type local network broadcast message MSG4 may include a field TYP, a field LTH, and a group bit-map GBM. The field TYP of the field CMB indicates the type of the local network broadcast message (e.g., indicates one type from among the first type, the second type, the third type, and the fourth type). The field LTH of the field CMB indicates the length of the group bit-map GBM. The group bit-map GBM of the field CMB indicates the groups which the fourth type local network broadcast message MSG4 corresponds to.

Each of the group identifiers GID of the fourth type local network broadcast message MSG4 includes a field TAG, a field LTH, a node bit-map NBM, data or a command DATA/CMD, and a field SGT. The field TAG of one group identifier GID indicates a group number which the fourth type local network broadcast message MSG4 corresponds to. The field LTH of this group identifier GID indicates the length of the node bit-map NBM. The node bit-map NBM of this group identifier GID indicates the nodes which this group identifier GID corresponds to. The data or command DATA/CMD of this group identifier GID is the data or command which the network apparatus 100 wishes to transmit to the nodes corresponding to the node bit-map NBM in this group identifier GID. The field SGT of this group identifier GID indicates a serial number of the data or command DATA/CMD of this group identifier GID.

For example, when the group bit-map GBM of the fourth type local network broadcast message MSG4 in the broadcast packet PKT is "00000011," the fourth type local network broadcast message MSG4 has two group identifiers. In instances where the node bit-map NBM in a first group identifier GID (e.g., corresponding to group G1) is "00000010," the node N2 operates according to the data or command DATA/CMD in the first group identifier GID, and the node N1 dismisses the data or command DATA/CMD in the first group identifier GID. While In instances where the node bit-map NBM in a second group identifier GID (e.g., corresponding to group G2) is "00010100," the nodes N3, N5 operate according to the data or command DATA/CMD in the second group identifier GID, and the node N4 dismisses the data or command DATA/CMD in the second group identifier GID.

By using the broadcast packet PKT having the fourth type local network broadcast message MSG4, different commands and/or data can be transmitted to different groups simultaneously, to make a portion of the nodes in the same group operate identically. Additionally, by using the group bit-map GBM and the node bit-map NBM, the length of the broadcast packet PKT can be shortened greatly.

In one embodiment, the network apparatus 100 can acquire the group bit-map GBM by performing a logical-OR operation between/among the binary bit-strings corresponding to the group numbers in the look up table T1. For example, the network apparatus 100 may performs a logical-OR operation between a binary bit-string "00000001" corresponding to a group number "0001" and a binary bit-string "00000010" corresponding to a group number "0002" to acquire a group bit-map GBM (with a value "00000011") corresponding to the groups G1, G2.

In one embodiment, the network apparatus 100 can acquire the node bit-map NBM by performing a logical-OR operation between/among the binary bit-strings corresponding to the node numbers in the look up table T1. For example, the network apparatus 100 may perform a logical-OR operation among a binary bit-string "00000010" corresponding to a node number "0002," a binary bit-string "00000100" corresponding to a node number "0003," and a binary bit-string "00001000" corresponding to a node number "0004" to acquire a node bit-map NBM (with a value "00001110") corresponding to the nodes N2-N4.

In one embodiment, each of the nodes N1-N6 may store a binary bit-string corresponding to the group number thereof. When a node receives a broadcast packet PKT having the third type local network broadcast message MSG3 or the fourth type local network broadcast message MSG4, this node can perform a logical-AND operation between the stored binary bit-string corresponding to the group number thereof and the group bit-map GBM in the broadcast packet PKT, to determine whether to dismiss the operating information of the local network broadcast message.

For example, when the group numbers stored in all of the nodes of the group G2 correspond to a binary bit-string "00000010," a group bit-map GBM of a third type local network broadcast message MSG3 in a broadcast packet PKT is "00000011," and the group bit-map GBM of the third type local network broadcast message MSG3 in the broadcast packet PKT is 0, since the result of the logical-AND operation between the binary bit-strings "00000010" and "00000011" is "1," all of the nodes of the group G2 operate according to the operating information of this broadcast packet PKT. As another example, when the group numbers stored in all of the nodes of the group G2 corresponds to a binary bit-string "00000010," a group bit-map GBM of a third type local network broadcast message MSG3 in a broadcast packet PKT is "00000001," and the group bit-map GBM of the third type local network broadcast message MSG3 in the broadcast packet PKT is 0, since the result of the logical-AND operation between the binary bit-strings "00000010" and "00000001" is "0," all of the nodes of the group G2 dismiss the operating information of this broadcast packet PKT.

Similarly, in one embodiment, each of the nodes N1-N6 may store a binary bit-string corresponding to the node number thereof. When a node receives a broadcast packet PKT having the third type local network broadcast message MSG3 or the fourth type local network broadcast message MSG4, this node can perform a logical-AND operation between the stored binary bit-string corresponding to the node number thereof and the node bit-map NBM in the broadcast packet PKT, to determine whether to dismiss the operating information of the local network broadcast message.

For example, when the node numbers stored in the node N3 corresponds to a binary bit-string "00000100," and the node bit-map NBM of a third type local network broadcast message MSG3 in a broadcast packet PKT is "00000111," since the result of the logical-AND operation between the binary bit-strings "00000100" and "00000111" is "1," the node N3 operates according to the operating information of this broadcast packet PKT. As another example, when the node numbers stored in the node N3 corresponds to a binary bit-string "00000100," and the node bit-map NBM of a third type local network broadcast message MSG3 in a broadcast packet PKT is "00000001," since the result of the logical-AND operation between the binary bit-strings "00000100" and "00000001" is "0," the node N3 dismisses the operating information of this broadcast packet PKT.

In the following paragraphs, two applications of the present disclosure are provided, but the present disclosure is not limited to such applications.

Figure 6A:
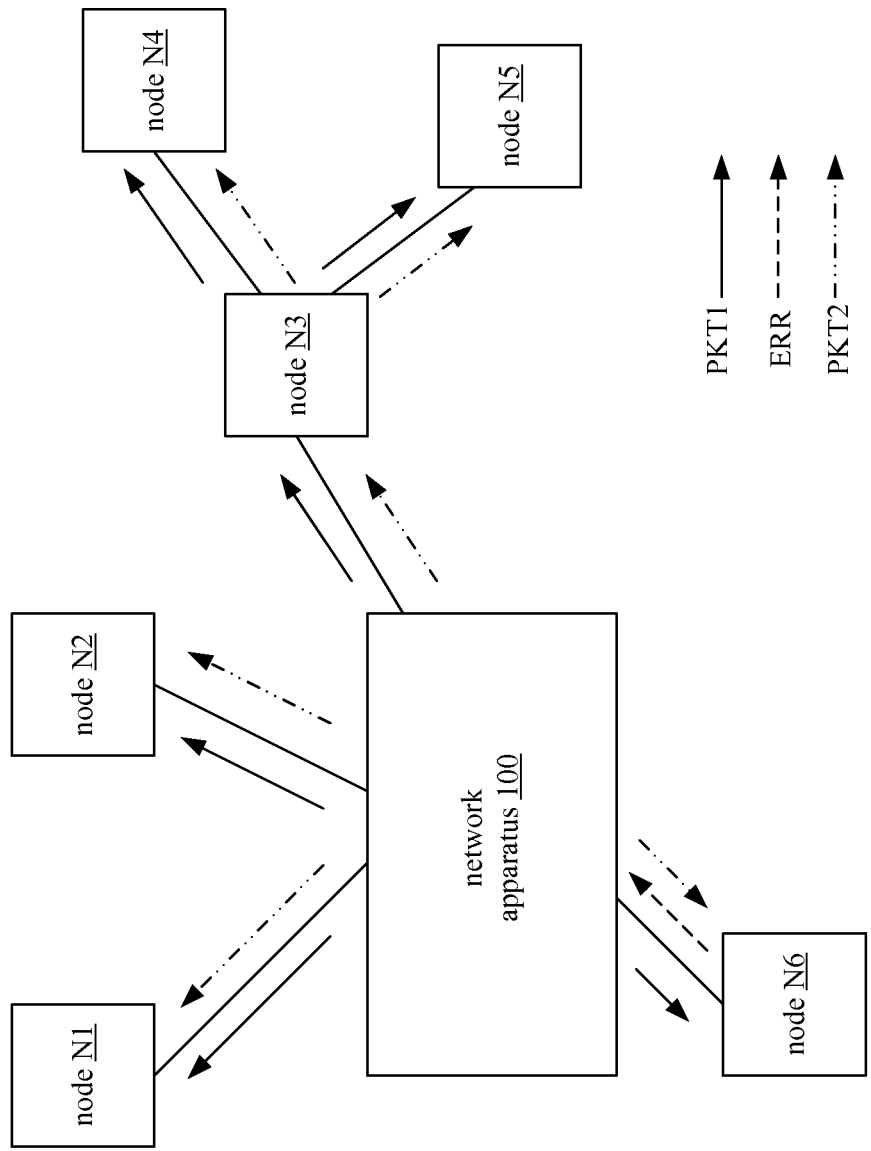
FIG. 6A illustrates an operative example of an application of the present disclosure.

Reference is made to FIG. 6A. In a first application, the network apparatus 100 may update the firmware of all of the nodes N1-N6 in the network system 10 to an identical version.

Particularly, the network apparatus 100 may transmit firmware updating data to all of the nodes N1-N6 through a first broadcast packet PKT1 with the third type local network broadcast message MSG3. Both of the group bit-map GBM and the node bit-map NBM of the third type local network broadcast message MSG3 are 0, and the data or command DATA/CMD of the third type local network broadcast message MSG3 includes the firmware updating data.

The nodes N1-N6 determine whether the first broadcast packet PKT1 with the third type local network broadcast message MSG3 is correctly transmitted. If so, the nodes N1-N6 update the firmware therein according to the third type local network broadcast message MSG3 of the first broadcast packet PKT1. If the first broadcast packet PKT1 with the third type local network broadcast message MSG3 is incorrectly transmitted, a corresponding node may return an error message ERR to the network apparatus 100. For example, when the node N6 receives an incorrect first broadcast packet PKT1, the node N6 returns an error message ERR to the network apparatus 100.

After the error message ERR is received, the network apparatus 100 retransmits the firmware updating data to the node where the error occurs according to the error message ERR by a second broadcast packet PKT2 with the first type local network broadcast message MSG1. It should be noted that although the second broadcast packet PKT2 with the first type local network broadcast message MSG1 is transmitted to all of the nodes N1-N6, only the node N6 operates according to the first type local network broadcast message MSG1 in the second broadcast packet PKT2, and the nodes N1-N5 refrain from operating according to the first type local network broadcast message MSG1 in the second broadcast packet PKT2. In one embodiment, the step of broadcasting the second broadcast packet PKT2 can be selectively omitted.

Figure 6B:
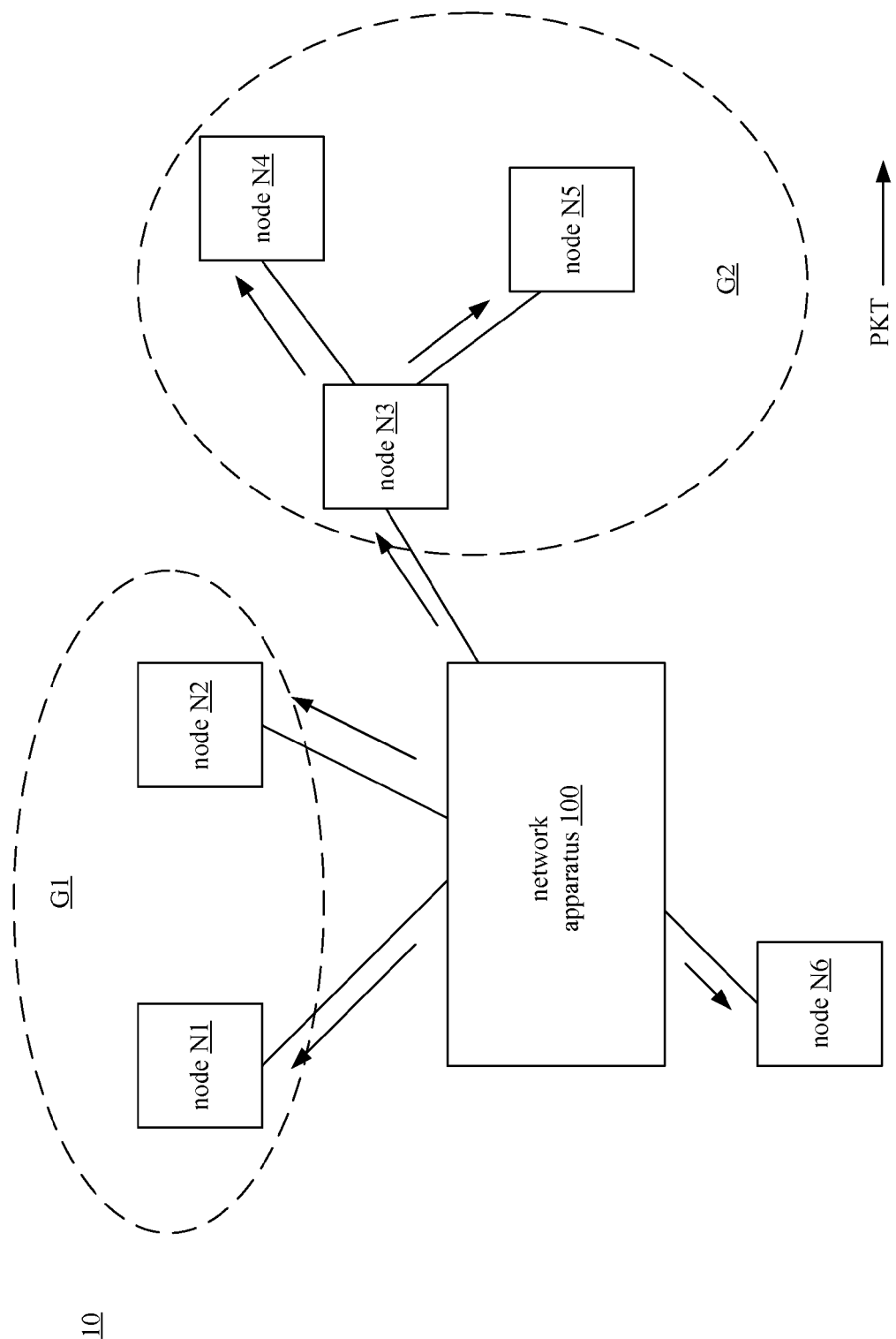
FIG. 6B illustrates an operative example of an application of the present disclosure.

Reference is made to FIG. 6B. In a second application, the nodes N1, N2 in the group G1 are illumination apparatuses in the first floor of a building, and the nodes N3-N5 in the group G2 are illumination apparatuses in the second floor of the same building. The network apparatus 100 may transmit the illumination command to all of the nodes N1-N2 in the group G1 by a broadcast packet PKT with the third type local network broadcast message MSG3, so as to command the illumination apparatuses on the first floor of this building to light up. The group bit-map GBM (e.g., with a value "00000001") of the third type local network broadcast message MSG3 in the broadcast packet PKT corresponds to the group G1, and the node bit-map NBM of the third type local network broadcast message MSG3 in the broadcast packet PKT is 0. It should be noted that although the broadcast packet PKT with the third type local network broadcast message MSG3 is transmitted to all of the nodes N1-N6, only the nodes N1, N2 operate according to the third type local network broadcast message MSG3 in the broadcast packet PKT, and the nodes N3-N6 refrain from operating according to the third type local network broadcast message MSG3 in the broadcast packet PKT.

By utilizing one of the aforementioned embodiments, the network apparatus 100 can directly broadcast a broadcast packet PKT to all of the nodes N1-N6 all at once, so as to allow the nodes N1-N6 to determine whether to dismiss the operating information in the local network broadcast message of the broadcast packet PKT according to the local network broadcast message (e.g., one of the first to fourth type local network broadcast messages MSG1-MSG4). Through such operations, it is not necessary to transmit the packets to the nodes N1-N6 one by one, so that slowdown of the network system 10 caused by such single-packet transmission can be avoided.

Figure 7:
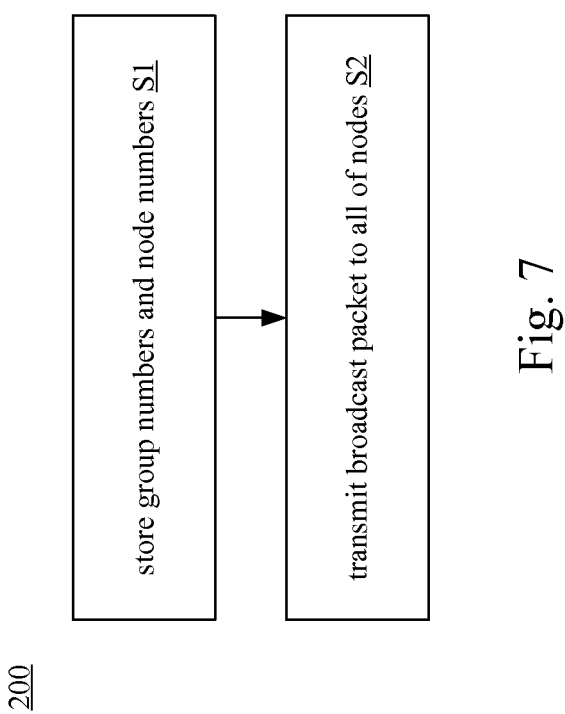
FIG. 7 is a flowchart of an operating method of a network apparatus in accordance with one embodiment of the present disclosure.

FIG. 7 is a flowchart of an operating method 200 of a network apparatus in accordance with one embodiment of the present disclosure.

The operating method 200 can be applied to a network apparatus having a structure that is the same as or similar to the structure of the network apparatus 100 shown in FIG. 1. To simplify the description below, in the following paragraphs, the embodiment shown in FIG. 1 will be used as an example to describe the operating method 200 according to an embodiment of the present disclosure. However, the present disclosure is not limited to application to the embodiment shown in FIG. 1.

In addition, it should be noted that in the steps of the following operating method 200, no particular sequence is required unless otherwise specified. Moreover, the following steps also may be performed simultaneously or the execution times thereof may at least partially overlap.

Furthermore, the steps of the following operating method 200 may be added to, replaced, and/or eliminated as appropriate, in accordance with various embodiments of the present disclosure.

In this embodiment, the operating method 200 includes the steps outlined below.

In step S1, the network apparatus 100 utilizes a storage component 120 to store a plurality of group numbers corresponding to the groups G1, G2 and a plurality of node numbers corresponding to the nodes N1-N6. It should be noted that details of the data stored in the storage component 120 can be ascertained with reference to the paragraphs above, and a description in this regard will not be repeated herein.

In step S2, the network apparatus 100 utilizes a controller 110 to transmit a broadcast packet PKT to all of the nodes N1-N6. The broadcast packet PKT includes one of the first to fourth type local network broadcast messages MSG1-MSG4. This local network broadcast message corresponds to at least one of the group numbers of the groups G1, G2 and the node numbers of the nodes N1-N6. Each of the nodes N1-N6 determines whether to dismiss the operating information of this local network broadcast message of the broadcast packet PKT according to this local network broadcast message of the broadcast packet PKT.

By utilizing one of the aforementioned embodiments, the network apparatus 100 can directly broadcast a broadcast packet PKT to all of the nodes N1-N6 all at once, so as to allow the nodes N1-N6 to determine whether to dismiss the operating information in the local network broadcast message of the broadcast packet PKT according to the local network broadcast message (e.g., one of the first to fourth type local network broadcast messages MSG1-MSG4). Through such operations, it is not necessary to transmit the packets to the nodes N1-N6 one by one, so that slowdown of the network system 10 caused by such single-packet transmission can be avoided.

Figure 8:
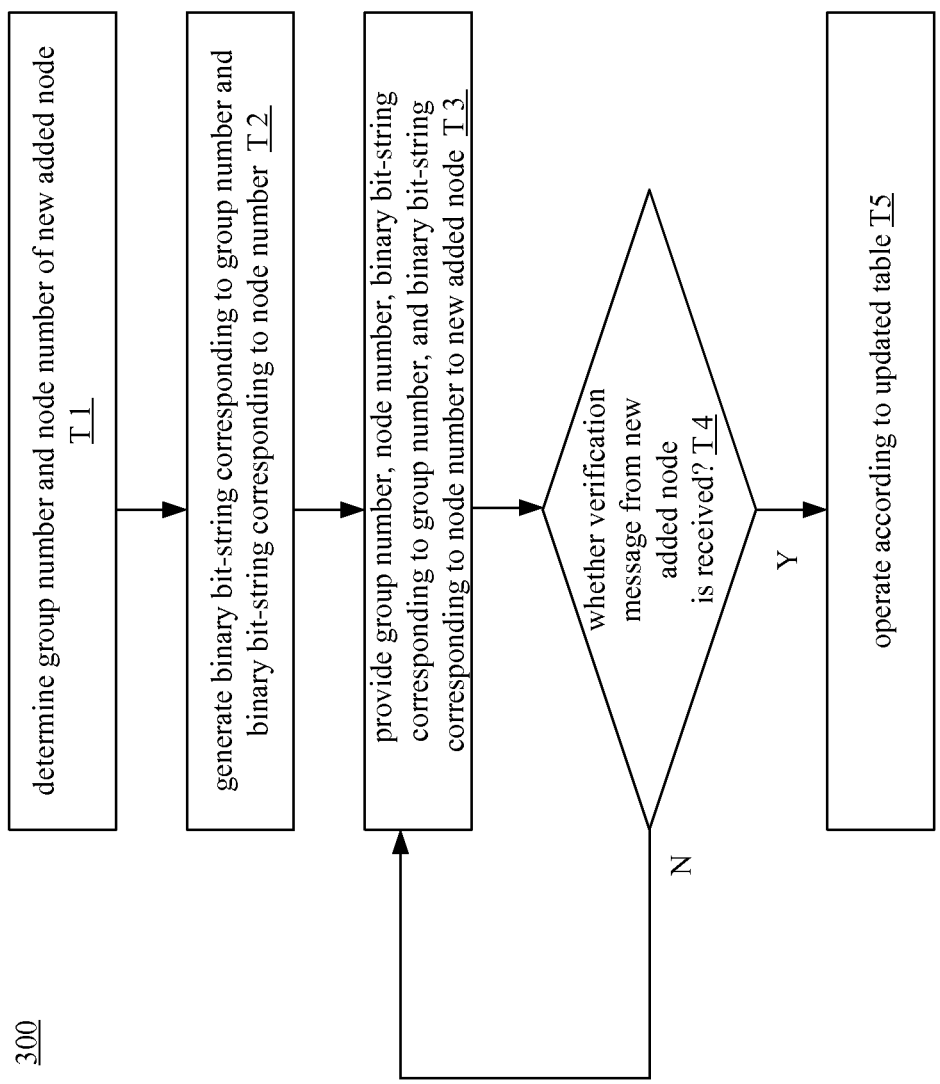
FIG. 8 is a flowchart of an operating method of a network apparatus in accordance with another embodiment of the present disclosure.

FIG. 8 is a flowchart of an operating method 300 of a network apparatus in accordance with another embodiment of the present disclosure.

The operating method 300 can be applied to a network apparatus having a structure that is the same as or similar to the structure of the network apparatus 100 shown in FIG. 1. To simplify the description below, in the following paragraphs, the embodiment shown in FIG. 1 will be used as an example to describe the operating method 300 according to an embodiment of the present disclosure. However, the present disclosure is not limited to application to the embodiment shown in FIG. 1.

In addition, it should be noted that in the steps of the following operating method 300, no particular sequence is required unless otherwise specified. Moreover, the following steps also may be performed simultaneously or the execution times thereof may at least partially overlap.

Furthermore, the steps of the following operating method 300 may be added to, replaced, and/or eliminated as appropriate, in accordance with various embodiments of the present disclosure.

In this embodiment, the operating method 300 includes the steps outlined below.

In step T1, after the network apparatus 100 receives an adding request from the new added node, the network apparatus 100 determines a group number and a node number of the new added node. In one embodiment, the network apparatus 100 may determine the group number and the node number of the new added node according to an administrator input command.

In step T2, the network apparatus 100 generates a binary bit-string corresponding to the group number of the new added node and a binary bit-string corresponding to the node number of the new added node according to the group number and the node number of the new added node.

In step T3, the network apparatus 100 provides the group number of the new added node, the node number of the new added node, the binary bit-string corresponding to the group number of the new added node, and the binary bit-string corresponding to the node number of the new added node to the new added node, so as to allow the new added node to operate according to this information (e.g., to determine whether to dismiss the operating information in the local network broadcast message of the broadcast packet PKT).

In step T4, the network apparatus 100 determines whether a verification message from the new added node is received. If so, step T5 is performed. If not, the procedure returns to step T3.

In step T5, the network apparatus 100 updates the look up table T1 in the storage component 120 with the group number of the new added node, the node number of the new added node, the binary bit-string corresponding to the group number of the new added node, and the binary bit-string corresponding to the node number of the new added node, and operates according to the updated table.

Figure 9:
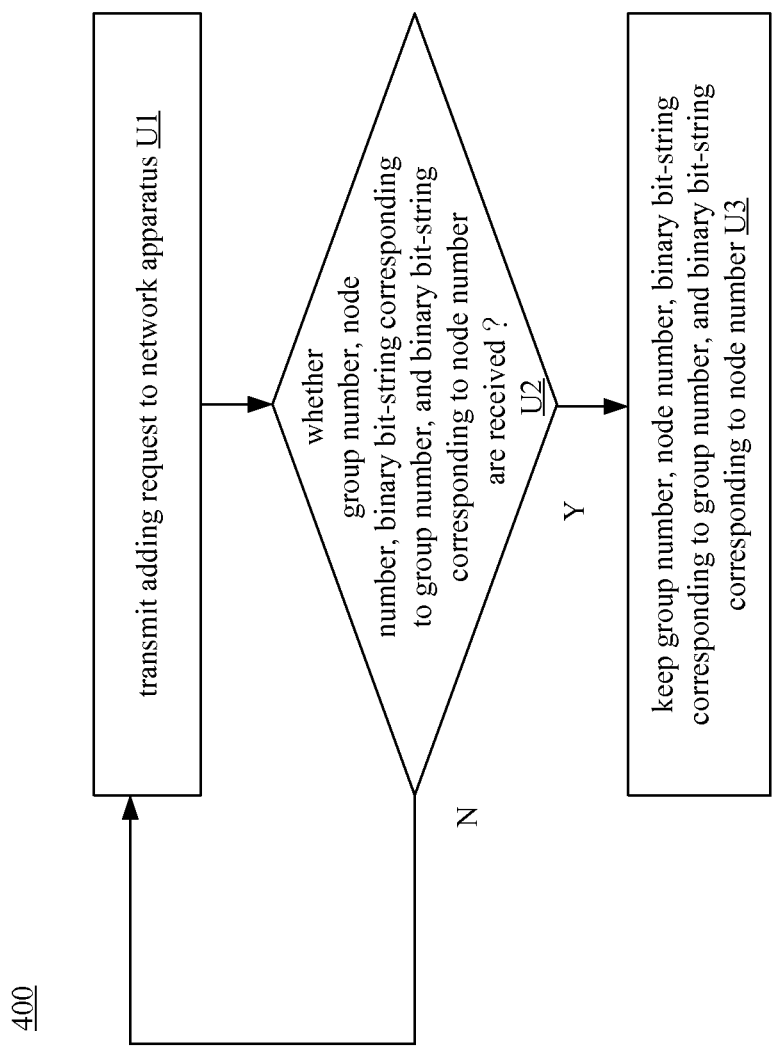
FIG. 9 is a flowchart of an operating method of a node in accordance with one embodiment of the present disclosure.

FIG. 9 is a flowchart of an operating method 400 of a node in accordance with one embodiment of the present disclosure.

The operating method 400 can be applied to a node of the network system 10 shown in FIG. 1. However, the present disclosure is not limited to application to the embodiment shown in FIG. 1.

In addition, it should be noted that in the steps of the following operating method 400, no particular sequence is required unless otherwise specified. Moreover, the following steps also may be performed simultaneously or the execution times thereof may at least partially overlap.

Furthermore, the steps of the following operating method 400 may be added to, replaced, and/or eliminated as appropriate, in accordance with various embodiments of the present disclosure.

In this embodiment, the operating method 400 includes the steps outlined below.

In step U1, after a new added node connects to the network system 10, the new added node transmits an adding request to the network apparatus 100.

In step U2, the new added node determines whether a group number thereof, a node number thereof, a binary bit-string corresponding to the group number thereof, and a binary bit-string corresponding to the node number thereof are received from the network apparatus 100. If so, step U3 is performed. If not, the procedure is returned to step U1.

In step U3, the new added node provides a verification message to the network apparatus 100, keeps the group number thereof, the node number thereof, the binary bit-string corresponding to the group number thereof, and the binary bit-string corresponding to the node number thereof received from the network apparatus 100, and operates according to this information (e.g., to determine whether to dismiss the operating information in the local network broadcast message of the broadcast packet PKT).

Through such operations, the accuracy of the data in the network system 10 can be maintained after the topology of the network system 10 is changed.

Although the present invention has been described in considerable detail with reference to certain embodiments thereof, other embodiments are possible. Therefore, the scope of the appended claims should not be limited to the description of the embodiments contained herein.

What is claimed is:

1. A network apparatus coupled to a plurality of nodes, wherein the nodes are clustered into a plurality of groups, the network apparatus is a coordinator in a sensor network, and the network apparatus comprises:

a storage component configured for storing a plurality of group numbers corresponding to the groups and a plurality of node numbers corresponding to the nodes; and a controller configured for transmitting a broadcast packet to all of the nodes, wherein the broadcast packet is defined in an IEEE 802.15 protocol;

wherein the broadcast packet includes a local network broadcast message, the local network broadcast message comprises operating information, the local network broadcast message corresponds to at least one of the group numbers and the node numbers, and each of the nodes determines whether to dismiss the operating information of the broadcast packet according to the local network broadcast message of the broadcast packet, wherein the local network broadcast message comprises a group bit-map, a node bit-map, and data or a command, the operating information corresponds to the data or the command, and when at least one corresponding node corresponding to the group bit-map and the node bit-map receives the broadcast packet, the corresponding node operates according to the operating information corresponding to the data or the command, wherein the controller is further configured for:

determining a corresponding group number and a corresponding node number of a new added node when an adding request from the new added node is received;

generating a first binary bit-string according to the corresponding group number;

generating a second binary bit-string according to the corresponding node number; and providing the corresponding group number, the corresponding node number, the first binary bit-string, and the second binary bit-string to the new added node, wherein the new added node determines not to dismiss the operating information of the broadcast packet when the first binary bit-string and the second binary bit-string in the broadcast packet are:

(i) zero;

(ii) a bit corresponding to the new node in the first binary bit-string is set in the group bitmap and a bit corresponding to the new added node in the second binary bit-string is set in the node bitmap;

(iii) a bit corresponding to the new added node in the first binary bit-string is set in the group bitmap and the node bitmap is zero; or (iv) a bit corresponding to the new added node in the second binary bit-string is set in the node bitmap and the group bitmap is zero, wherein otherwise, the new added node determines to dismiss the operation information of the broadcast packet.

2. The network apparatus as claimed in claim 1, wherein the group bit-map comprises a plurality of bits, and each of the bits of the group bit-map corresponds to one of the group numbers.

3. The network apparatus as claimed in claim 1, wherein the node bit-map comprises a plurality of bits, and each of the bits of the node bit-map corresponds to one of the node numbers.

4. The network apparatus as claimed in claim 1, wherein the local network broadcast message is located in a payload field of the broadcast packet.

5. An operating method of a network apparatus, wherein the network apparatus is coupled to a plurality of nodes, the nodes are clustered into a plurality of groups, the network apparatus is a coordinator in a sensor network, and the operating method comprises:

storing a plurality of group numbers corresponding to the groups and a plurality of node numbers corresponding to the nodes; and transmitting a broadcast packet to all of the nodes, wherein the broadcast packet is defined in an IEEE 802.15 protocol;

wherein the broadcast packet includes a local network broadcast message, the local network broadcast message comprises operating information, the local network broadcast message corresponds to at least one of the group numbers and the node numbers, and each of the nodes determines whether to dismiss the operating information of the broadcast packet according to the local network broadcast message of the broadcast packet, wherein the local network broadcast message comprises a group bit-map, a node bit-map, and data or a command, the operating information corresponds to the data or the command, and when at least one corresponding node corresponding to the group bit-map and the node bit-map receives the broadcast packet, the corresponding node operates according to the operating information corresponding to the data or the command;

wherein the operating method further comprises:

determining a corresponding group number and a corresponding node number of a new added node when an adding request from the new added node is received;

generating a first binary bit-string according to the corresponding group number;

generating a second binary bit-string according to the corresponding node number; and providing the corresponding group number, the corresponding node number, the first binary bit-string, and the second binary bit-string to the new added node, wherein the new added node determines not to dismiss the operating information of the broadcast packet when the first binary bit-string and the second binary bit-string in the broadcast packet are:

(i) zero;

(ii) a bit corresponding to the new node in the first binary bit-string is set in the group bitmap and a bit corresponding to the new added node in the second binary bit-string is set in the node bitmap;

(iii) a bit corresponding to the new added node in the first binary bit-string is set in the group bitmap and the node bitmap is zero; or (iv) a bit corresponding to the new added node in the second binary bit-string is set in the node bitmap and the group bitmap is zero, wherein otherwise, the new added node determines to dismiss the operation information of the broadcast packet.

6. The operating method as claimed in claim 5, wherein the group bit-map comprises a plurality of bits, and each of the bits of the group bit-map corresponds to one of the group numbers.

7. The operating method as claimed in claim 5, wherein the node bit-map comprises a plurality of bits, and each of the bits of the node bit-map corresponds to one of the node numbers.

8. The operating method as claimed in claim 5, wherein the local network broadcast message is located in a payload field of the broadcast packet.

9. An intelligent illumination system comprising:

a plurality of illumination nodes clustered as a plurality of groups; and a network apparatus coupled to the illumination nodes, wherein the network apparatus is a coordinator in a sensor network, and the network apparatus is configured for:

storing a plurality of group numbers corresponding to the groups and a plurality of node numbers corresponding to the illumination nodes; and transmitting a broadcast packet to all of the illumination nodes, wherein the broadcast packet is defined in an IEEE 802.15 protocol;

wherein the broadcast packet includes a local network broadcast message, the local network broadcast message comprises operating information, the local network broadcast message corresponds to at least one of the group numbers and the node numbers, and each of the illumination nodes determines whether to dismiss the operating information of the broadcast packet according to the local network broadcast message of the broadcast packet, wherein the local network broadcast message comprises a group bit-map, a node bit-map, and data or a command, the operating information corresponds to the data or the command, and when at least one corresponding illumination node corresponding to the group bit-map and the node bit-map receives the broadcast packet, the corresponding illumination node operates according to the operating information corresponding to the data or the command, wherein the network apparatus is further configured for:

determining a corresponding group number and a corresponding node number of a new added node when an adding request from the new added node is received;

generating a first binary bit-string according to the corresponding group number;

generating a second binary bit-string according to the corresponding node number; and providing the corresponding group number, the corresponding node number, the first binary bit-string, and the second binary bit-string to the new added node, wherein the new added node determines not to dismiss the operating information of the broadcast packet when the first binary bit-string and the second binary bit-string in the broadcast packet are:

(i) zero;

(ii) a bit corresponding to the new node in the first binary bit-string is set in the group bitmap and a bit corresponding to the new added node in the second binary bit-string is set in the node bitmap;
(iii) a bit corresponding to the new added node in the first binary bit-string is set in the group bitmap and the node bitmap is zero; or
(iv) a bit corresponding to the new added node in the second binary bit-string is set in the node bitmap and the group bitmap is zero,
wherein otherwise, the new added node determines to dismiss the operation information of the broadcast packet.

10. The intelligent illumination system as claimed in claim 9, wherein the group bit-map comprises a plurality of first bits, each of the first bits of the group bit-map corresponds to one of the group numbers, the node bit-map comprises a plurality of second bits, and each of the second bits of the node bit-map corresponds to one of the node numbers.

11. The network apparatus as claimed in claim 1, wherein the controller acquires the group bit-map by performing a logical-OR operation between the first binary bit-strings of at least two of the groups,
wherein the controller acquires the node bit-map by performing the logical-OR operation between the second binary bit-strings of at least two of the nodes,
the new added node performs a logical-AND operation between the first binary bit-string of itself and the group bit-map in the broadcast packet to determine whether to dismiss the operating information of the local network broadcast message,
the new added node performs the logical-AND operation between the second binary bit-string of itself and the node bit-map in the broadcast packet to determine whether to dismiss the operating information of the local network broadcast message.

* * * * *